US012684307B2

(12) United States Patent
Luo et al.

(10) Patent No.: US 12,684,307 B2
(45) Date of Patent: Jul. 14, 2026

(54) AUDIO SIGNAL PROCESSING METHOD FOR GENERATING A SIMULATED IMPULSE RESPONSE FOR MULTIPLE AUDIO SOURCES AND APPARATUS, AND COMPUTER DEVICE THEREOF

(71) Applicant: Tencent Technology (Shenzhen) Company Limited, Shenzhen (CN)

(72) Inventors: Yi Luo, Shenzhen (CN); Jianwei Yu, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 231 days.

(21) Appl. No.: 18/416,757

(22) Filed: Jan. 18, 2024

(65) Prior Publication Data

US 2024/0244390 A1 Jul. 18, 2024

Related U.S. Application Data

(63) Continuation of application No. PCT/CN2023/092203, filed on May 5, 2023.

(30) Foreign Application Priority Data

Jun. 22, 2022 (CN) ........................ 202210711541.X

(51) Int. Cl.
*H04S 7/00* (2006.01)

(52) U.S. Cl.
CPC .............. *H04S 7/305* (2013.01); *H04S 7/302* (2013.01); *H04S 7/307* (2013.01); *H04S 2400/11* (2013.01); *H04S 2400/15* (2013.01)

(58) Field of Classification Search
CPC .......... H04S 7/302; H04S 7/305; H04S 7/307; H04S 2400/11; H04S 2400/15
See application file for complete search history.

(56) References Cited

U.S. PATENT DOCUMENTS 11,112,389 B1 9/2021 Robinson et al.
11,172,320 B1 * 11/2021 Pelzer ..................... G06T 15/06
(Continued)

FOREIGN PATENT DOCUMENTS

CN 108802687 A 11/2018
CN 109001680 A 12/2018
(Continued)

OTHER PUBLICATIONS

Tencent Technology, ISR, PCT/CN2023/092203, Sep. 10, 2023, 3 pgs.
(Continued)

*Primary Examiner* — James K Mooney
(74) *Attorney, Agent, or Firm* — Morgan, Lewis & Bockius LLP

(57) ABSTRACT

This application relates to an audio signal processing method performed by a computer device. The method includes: obtaining a set of scenario layout parameters corresponding to a current simulated scenario; sampling, at a preset sampling rate, an audio signal emitted by at least one audio source to obtain at least one sample; determining, based on a linear distance, a simulated traveling distance corresponding to each sample; determining a number of simulated reflections based on the simulated traveling distance; determining a reflection coefficient based on an environmental-spatial parameter, and respectively determining, based on the reflection coefficient, the simulated traveling distance, and the number of simulated reflections, a simulated reflection loss corresponding to each audio source; and generating a simulated impulse response under the current simulated scenario based on the simulated reflection loss corresponding to each audio source.

18 Claims, 6 Drawing Sheets

(56) References Cited

U.S. PATENT DOCUMENTS

| | | | | |
|---|---|---|---|---|
| 2003/0202667 | A1* | 10/2003 | Sekine | G10H 1/0091 84/630 |
| 2021/0287651 | A1 | 9/2021 | Eronen et al. | |
| 2021/0343305 | A1* | 11/2021 | Jin | G10L 21/02 |

FOREIGN PATENT DOCUMENTS

| | | | |
|---|---|---|---|
| CN | 111312273 | A | 6/2020 |
| CN | 111341303 | A | 6/2020 |
| CN | 111766303 | A | 10/2020 |
| CN | 112770227 | A | 5/2021 |
| CN | 115273795 | A | 11/2022 |
| JP | 2005083932 | A | 3/2005 |
| WO | WO 2019066348 | A1 | 4/2019 |

OTHER PUBLICATIONS

Tong Yin et al., "Design and Performance Research of Reverberation Filter Based on Source Image Method", Journal of Network New Media, vol. 4, No. 1, Jan. 15, 2015, 2 pgs.

* cited by examiner

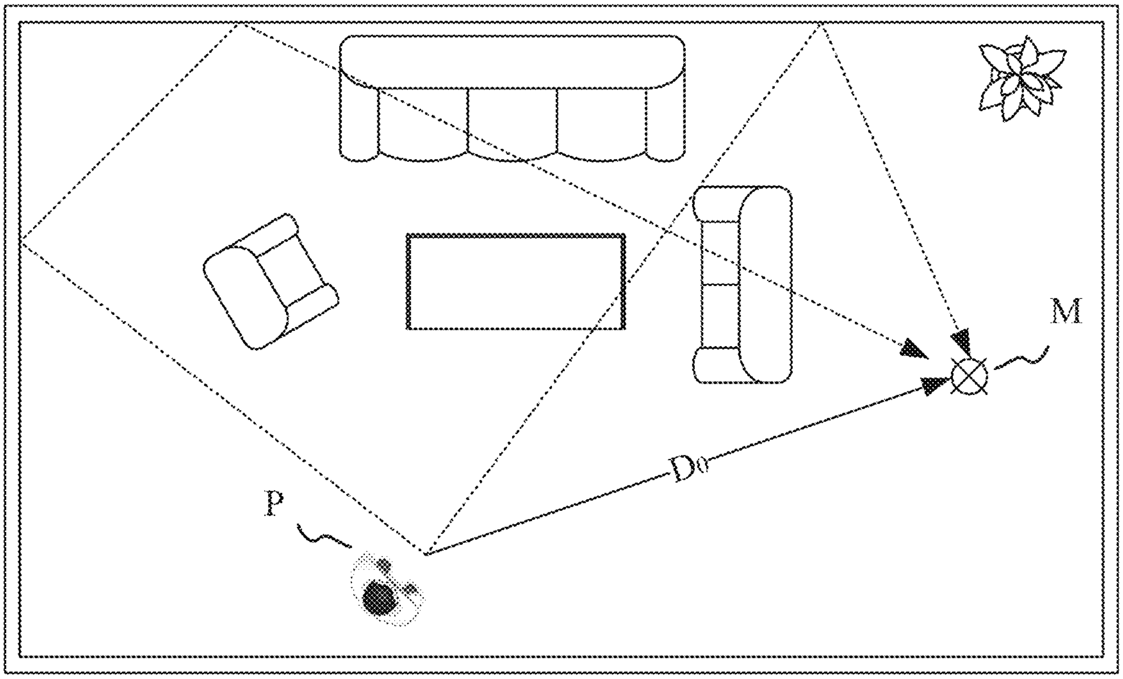

FIG. 3

S402

Determine a maximum simulated traveling distance among simulated traveling distances corresponding to samples

S404

Determine a maximum number of simulated reflections based on a positive correlation between a traveling distance and a number of reflections of an audio signal as well as the maximum simulated traveling distance

S406

Determine a distance proportional relationship between the simulated traveling distance and the maximum simulated traveling distance

S408

Determine, based on the distance proportional relationship and the maximum number of simulated reflections, a number of simulated reflections corresponding to each simulated traveling distance, a reflection proportional relationship between the number of simulated reflections and the maximum number of simulated reflections being consistent with the distance proportional relationship

FIG. 4

AUDIO SIGNAL PROCESSING METHOD FOR GENERATING A SIMULATED IMPULSE RESPONSE FOR MULTIPLE AUDIO SOURCES AND APPARATUS, AND COMPUTER DEVICE THEREOF

CROSS-REFERENCE TO RELATED APPLICATIONS

This application is a continuation application of PCT Patent Application No. PCT/CN2023/092203, entitled "AUDIO SIGNAL PROCESSING METHOD AND APPARATUS, AND COMPUTER DEVICE" filed on May 5, 2023, which claims priority to Chinese Patent Application No. 202210711541.X, entitled "SIMULATED IMPULSE RESPONSE GENERATION METHOD AND APPARATUS, AND COMPUTER DEVICE" filed with the China National Intellectual Property Administration on Jun. 22, 2022, all of which is incorporated herein by reference in its entirety.

FIELD OF THE TECHNOLOGY

This application relates to the field of audio processing technologies, and in particular, to an audio signal processing method and apparatus, a computer device, a storage medium, and a computer program product.

BACKGROUND OF THE DISCLOSURE

In recent years, with the development of computer technologies, research and application fields of room acoustics have become increasingly more extensive, and are often used for assisting in design and auralization of architectural acoustics. Reverberation is an important acoustic characteristic in the architectural acoustics. For a study of reverberation, a room impulse response (RIR) is a key direction. The room impulse response is a finite impulse response (FIR) that measures a delay and energy attenuation of an original audio caused due to sound attenuation and reflections when the sound propagates in closed or semi-open space.

In a variety of audio processing tasks, a large quantity of impulse responses are used for analysis. For example, for an audio processing model, accuracy of the audio processing model relies on a large quantity of pieces of training data for training. An impulse response in a real environment is captured by live recording. However, the method of collecting real data is difficult to satisfy needs of relying on a large quantity of pieces of data for analysis and processing and needs high costs, and it is difficult to cover different types of space and environment.

Therefore, how to efficiently obtain impulse responses that are in various space and environments and that are highly similar to the real environment is an urgent problem to be resolved.

SUMMARY

Based on this, it is necessary to provide an audio signal processing method and apparatus, a computer device, a computer-readable storage medium, and a computer program product that can quickly generate different kinds of impulse responses with respect to the foregoing technical problem.

According to various embodiments of this application, this application provides an audio signal processing method performed by a computer device. The method includes the following steps:

obtaining a set of scenario layout parameters corresponding to a current simulated scenario, the set of scenario layout parameters comprising a linear distance between a receiver and at least one audio source and a reflection coefficient;

sampling, at a preset sampling rate, an audio signal emitted by at least one audio source to obtain at least one sample;

determining, based on the linear distance between the receiver and the at least one audio source, a simulated traveling distance corresponding to each sample;

determining a number of simulated reflections based on the simulated traveling distance;

determining, based on the reflection coefficient, the simulated traveling distance, and the number of simulated reflections, a simulated reflection loss corresponding to each audio source; and generating a simulated impulse response under the current simulated scenario based on the simulated reflection loss corresponding to each audio source.

According to the various embodiments of this application, this application further provides a computer device. The computer device includes a memory and a processor. The memory stores computer instructions. When the processor executes the computer instructions, operations of the audio signal processing method are implemented.

According to the various embodiments of this application, this application further provides a non-transitory computer-readable storage medium. The computer-readable storage medium has a computer program stored thereon. When the computer program is executed by a processor, operations of the audio signal processing method are implemented.

BRIEF DESCRIPTION OF THE DRAWINGS

FIG. 3 is a schematic diagram of a current simulated environment according to some embodiments.

FIG. 4 is a schematic flowchart of steps of determining a number of simulated reflections according to some embodiments.

Figure 1:
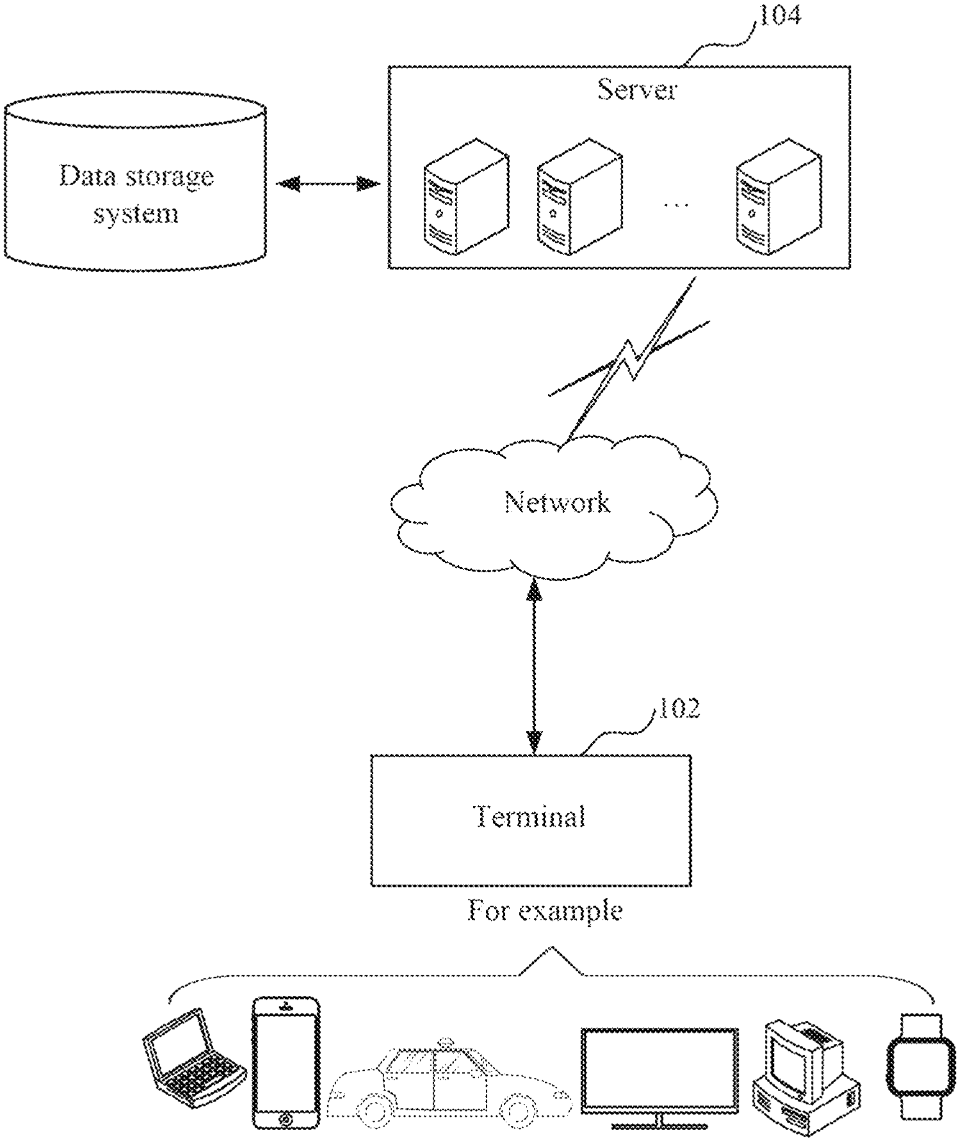
FIG. 1 is an application environment diagram of an audio signal processing method according to some embodiments.

To better describe and illustrate embodiments and/or examples of the present inventions disclosed here, reference may be made to one or more accompanying drawings. Additional details or examples used for describing the accompanying drawings are not to be considered as limiting the scope of any of the disclosed inventions, currently described embodiments and/or examples, and currently understood best modes of the present inventions.

DESCRIPTION OF EMBODIMENTS

To make the objectives, technical solutions, and advantages of this application clearer, the following further describes this application in detail with reference to the accompanying drawings and the embodiments. It is to be understood that the specific embodiments described herein are merely used to explain this application but are not intended to limit this application.

For an audio source and a receiver (such as a microphone or another radio device) in space, a room impulse response of the audio source and the receiver is determined by one or more of a size, furnishings, materials, ambient temperature and humidity of boundary space in which the audio source and the receiver are located, or spatial locations of the audio source and the receiver. The boundary space includes semi-open space and closed space.

A room impulse response in a real environment is generally acquired by live recording. However, collecting a real room impulse response in the form of live recording not only needs specific device and causes high costs, but also makes it difficult to cover different kinds of boundary space and environment types.

To easily generate different kinds of room impulse responses, the room impulse responses are generally simulated by a physical simulation. In a conventional physical simulation method, a reflection of an audio signal in a room is simulated by modeling a model that generally includes three types of models that are a reflection model, a scattering model, and a tracking model.

It is assumed that the reflection model is in a closed room, and boundaries of the room (such as a wall) are smooth. If an audio signal passes through the wall during transmission, a specular reflection with an energy loss occurs. A combination of all audio signals captured by the receiver after several reflections constitutes the room impulse response between the audio source and the receiver.

Based on the reflection model, in the scattering model, it is assumed that the wall is rough, so that the audio signal is to be scattered and energy-attenuated at random angles when passing through the wall. It is assumed that in the scattering model, total energy of all scattered audio signals is equal to total energy of the audio signals before scattering.

The tracking model uses ray tracking to track and simulate a propagation path of an audio signal, and needs advanced input of three-dimensional modeling information about the room or semi-open space, including wall information and interior furnishing information.

In the foregoing various physical simulation methods, room space needs to be modeled and a large number of audio signal reflections or scattering paths needs to be calculated. For different furnishings (such as tables and chairs, desktop furnishings, and furniture and electrical appliances) in the room, calculation complexity is too high, and efficiency of generating a room impulse response is low. In addition, a physical simulation method can only model a square room, and cannot simulate an irregular room type.

In another way, a simulated room impulse response is output by inputting a real collected room impulse response into a neural network for training. However, the method of generating by a neural network model not only relies on the real collected room impulse response, but the generated simulated room impulse response may not conform to a real audio signal reflection.

In view of this, an embodiment of this application provides an audio signal processing method that can cover different kinds of boundary space and environment types by quickly simulating different room types and furnishings. Based on a linear distance between the audio source and the receiver, various reflection paths and a number of reflections of an audio signal from the audio source to the receiver are simulated. This can conform to a real reflection of the audio signal. A simulated reflection loss corresponding to each audio source under different reflection paths and different number of reflections is calculated, to generate a simulated impulse response under a current simulated scenario. In the embodiment of this application, complex physical simulation and modeling are not needed. With high computational efficiency, there is no need to rely on a special computing platform (such as a graphics processing unit GPU) for complex calculations.

The audio signal processing method provided in the embodiment of this application can be applied to an application environment shown in FIG. 1. A terminal 102 communicates with a server 104 via a network. A data storage system may store data that the server 104 needs to process. The data storage system may be integrated on the server 104 or placed on a cloud or on another server. The terminal 102 or the server 104 obtains a scenario layout parameter. Based on different scenario layout parameters, different room types and environment types may be quickly simulated. For each set audio source, based on a linear distance between a receiver and at least one audio source in the scenario layout parameter, the terminal 102 or the server 104 may determine a simulated traveling distance corresponding to each sample at a preset sampling rate, and determine a number of simulated reflections based on the simulated traveling distance, to determine a simulated reflection loss corresponding to each audio source. Therefore, based on the simulated reflection loss corresponding to each audio source, the terminal 102 or the server 104 can generate a simulated impulse response under a current simulated scenario.

The terminal 102 may be, but is not limited to, one or more of any desktop computers, laptops, smartphones, tablet computers, intelligent voice interaction devices, Internet of Things devices, portable wearable devices, aircrafts, or the like. Internet of Things devices may be one or more of smart home appliances, smart in-vehicle devices, or the like. The smart home appliances are, for example, one or more of smart speakers, smart televisions, or smart air conditioners. The smart in-vehicle devices are, for example, in-vehicle terminals. The portable wearable devices may be one or more of smartwatches, smartbands, headsets, or the like.

The server 104 may be an independent physical server, or may be a server cluster or distributed system composed of a plurality of physical servers, or may be a cloud server providing basic cloud computing services, such as cloud services, cloud databases, cloud computing, cloud functions, cloud storage, network services, cloud communications, middleware services, domain name services, security services, content delivery network (CDN), or big data and artificial intelligence platforms.

In some embodiments, an APP or an application having functions such as music playback or voice interaction may be installed on the terminal, including a conventional application that needs to be installed independently, or a mini program that may be used without downloading and installing. The terminal may playback music with reverberation or reverberation by an application, or implement noise reduction in a process of voice interactions.

Figure 2:
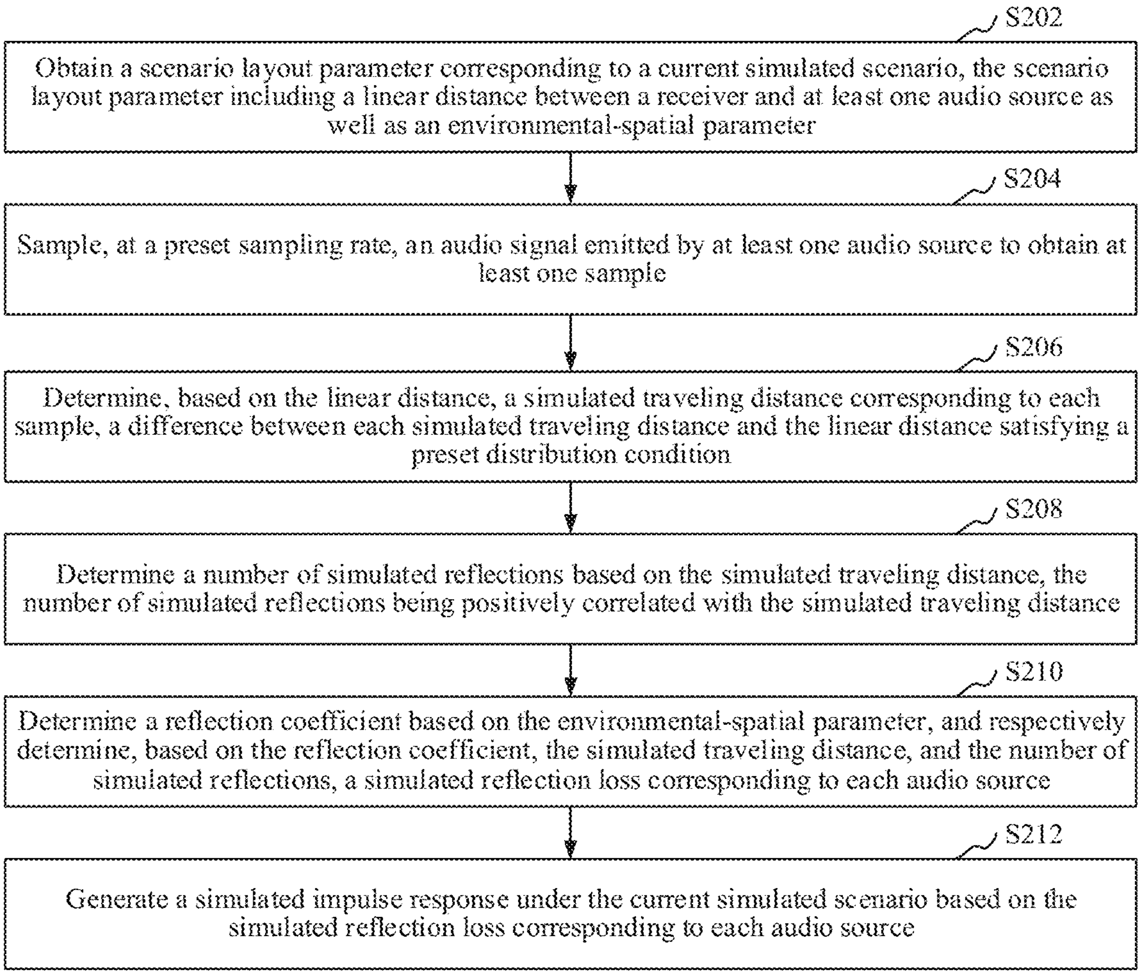
FIG. 2 is a schematic flowchart of an audio signal processing method according to some embodiments.

In some embodiments, as shown in FIG. 2, an audio signal processing method is provided. The method may be applied to a terminal or a server, or may be performed by both the terminal and the server. The following is an example of applying this method to a computer device, including the following steps:

Step S202: Obtain a scenario layout parameter corresponding to a current simulated scenario, the scenario layout parameter including a linear distance between a receiver and at least one audio source as well as an environmental-spatial parameter.

The current simulated scenario refers to a simulated scenario in an audio signal processing process. The scenario layout parameter is used for representing a scenario for simulation of an impulse response. The scenario includes, but is not limited to, one or more of configuration of an audio source and a receiver, or a physical environment, or the like. The audio source is a sound source in a simulated real physical world, for example, used for simulating a speaker in a real physical world. The receiver is a simulated audio signal collector, for example, a microphone in the real physical world. The audio source and the receiver may generally be simulated by running code on a central processing unit (CPU). The configuration of the audio source and the receiver refers to, for example, one or more of a quantity of audio sources and receivers, or a location of each audio source and receiver. In some embodiments, the location of each audio source and receiver may be represented by the linear distance between each audio source and receiver.

For example, assuming that there are C audio sources in a room, for each audio source c, a linear distance between the audio source and the receiver is $$D_0^c.$$

Therefore, a plurality of linear distances $$\{D_0^c\}_{c=1}^C$$

can be obtained for a variety of settings of different audio sources and receivers.

The physical environment refers to, for example, one or more of a size of the room, a shape of the room, roughness of a wall, or an arrangement of furniture in the room. The physical environment may be represented by the environmental-spatial parameter. The environmental-spatial parameter is used for simulating an environment and space of a sound source in a real world. In some embodiments, the environmental-spatial parameter includes, but is not limited to, one or more of an environmental reverberation parameter and an environmental furnishing parameter. The environmental reverberation parameter is used for representing an effect of the room on energy of the audio signal.

The environmental reverberation parameter refers to time needed for an energy attenuation preset value of an audio signal that is emitted by an audio source and after being reflected in the room or absorbed by the wall. For example, the environmental reverberation parameter is represented by $T_{60}$, and $T_{60}$ is used for representing time needed for an energy attenuation preset value 60 dB of the audio signal. A value range of the environmental reverberation parameter $T_{60}$ may be [0.1, 1.5].

The environmental furnishing parameter is used for representing furnishings in the room, for example, placement of tables, chairs, tabletop furnishings, furniture and electrical appliances. For example, the environmental furnishing parameter is represented by R, and a value range may be [0.1, $T_{60}$]. For example, as shown in FIG. 3, an audio source is used as an example for description. An audio source P and a receiver M are in a room. A linear distance between the audio source P and the receiver M is $D_0$. The linear distance reflects transmission of the audio signal directly to the receiver M and received by the receiver M without any reflection. In addition to direct audio signals, a variety of reflected audio signals are in the room, such as dashed lines with arrows shown in the figure.

In some embodiments, that the computer device obtains a scenario layout parameter corresponding to a current simulated scenario includes: The computer device obtains a preset environmental-spatial parameter to simulate, based on the environmental-spatial parameter, different room types and environment types. In addition, the computer device obtains a quantity and locations of preset audio sources and receivers, and obtains a linear distance between each audio source and the receiver based on the quantity and location of the audio source and the location of the receiver.

Step S204: Sample, at a preset sampling rate, an audio signal emitted by at least one audio source to obtain at least one sample.

The sampling rate represents frequency at which an audio signal is sampled. The preset sampling rate is a pre-set sampling rate. Based on the sampling rate and sampling time, the computer device may obtain a total quantity of sampling points within the sampling time. Specifically, based on the preset sampling rate, the computer device samples an audio signal emitted by each audio source to obtain a plurality of samples corresponding to each audio source. Essentially, the audio signal emitted by the audio source is a simulation of a sound wave emitted by a sound source in a real physical world. The sound wave is a mechanical wave produced by vibration of the sound source in the real physical world. In the embodiment of this application, because an impulse response in a room is simulated, the audio source is simulated by code, and the audio signal emitted by the audio source is generally a given piece of audio signal used for simulating a sound wave in a physical world. The sample records a status of the audio signal at the sampling time.

To capture an effect of a subtle change in a location of the audio source on reflections, such as a slight difference between different simulated traveling distances caused by the change in the location of the audio source, the computer device uses a high sampling rate when sampling, to obtain a more realistic reflection of the audio signal.

For example, for an audio source c, the computer device samples, based on the preset sampling rate, an audio signal emitted by the audio source c, to obtain RT samples $$\{DR_i^c\}_{i=1}^{RT}$$

corresponding to the audio source c.

Step S206: Determine, based on the linear distance, a simulated traveling distance corresponding to each sample at the preset sampling rate, a difference between each simulated traveling distance obtained by sampling and the linear distance satisfying a preset distribution condition.

Each sample corresponds to the simulated traveling distance obtained by sampling. The simulated traveling distance represents a distance traveled by the audio signal in a process in which starting from the audio source, the audio signal emitted by the audio source is reflected and then received by the receiver.

Because a large quantity of objects are generally in a room in an actual scenario, and the audio signal is usually more likely to be received by the receiver after a plurality of reflections, a quantity of reflected audio signals traveling a longer distance is greater than a quantity of audio signals received by the receiver after a small quantity of reflections. Therefore, to simulate a situation in which the audio signal is received by the receiver after being reflected by different object surfaces, and to conform to an actual physical scenario that more reflections of the audio signal may indicate a longer traveling distance. In the embodiment of this application, the difference between each simulated traveling distance and the linear distance satisfies the preset distribution condition. The preset distribution condition means that a plurality of simulated traveling distances obtained by sampling follow the following distribution: Simulated traveling distances close to the linear distance are to be less, and simulated traveling distances greater than the linear distance are to be more. In addition, in the embodiment of this application, according to the actual physical scenario, it is assumed that the simulated traveling distance obtained by sampling has a proportional relationship with the linear distance.

In some embodiments, that the computer device determines, based on the linear distance, the simulated traveling distance corresponding to each sample at the preset sampling rate includes: For each audio source, the computer device samples, at the preset sampling rate, an audio signal emitted by a corresponding audio source, to obtain a plurality of samples distributed under the preset distribution condition. Each sample corresponds to a proportional relationship between a simulated traveling distance and a corresponding linear distance. Based on the obtained linear distance and the proportional relationship, the computer device may obtain a plurality of simulated traveling distances distributed under the preset distribution condition. For example, a simulated traveling distance is proportional to a corresponding linear distance. For example, for each audio source c, the computer device samples to obtain RT samples $$\{DR_i^c\}_{i=1}^{RT}.$$

An i$^{th}$ simulated traveling distance obtained by sampling is $$DR_i^c.$$

Step S208: Determine a number of simulated reflections based on the simulated traveling distance, the number of simulated reflections being positively correlated with the simulated traveling distance.

Because a longer traveling distance of the audio signal may indicate more reflections, and the traveling distance of the audio signal is positively correlated with the number of the reflections. Correspondingly, the computer device also follows the actual physical law when simulating a transmission process of the audio signal. Therefore, in the embodiment of this application, according to the actual physical scenario, it is assumed that the simulated traveling distance of the audio signal is also positively correlated with the number of simulated reflections. The number of simulated reflections is used for simulating a number of reflections of a sound wave in space represented by the current simulated scenario during a process from the sound wave emitted by the sound source to the receiver receiving the sound wave in the real physical world. Therefore, the computer device can determine, based on a positive correlation between the simulated traveling distance and the number of simulated reflections and the simulated traveling distance obtained by sampling, the number of simulated reflections corresponding to the simulated traveling distance.

For example, for each audio source c, based on a simulated traveling distance $$DR_i^c$$

obtained by sampling, the computer device determines a number of simulated reflections $$RR_i^c$$

corresponding to the simulated traveling distance $$DR_i^c.$$

In some embodiments, that the computer device determines a number of simulated reflections based on the simulated traveling distance includes: For each audio source, the computer device determines the corresponding number of simulated reflections based on the positive correlation between the simulated traveling distance and the number of simulated reflections as well as the simulated traveling distance obtained by sampling. In some embodiments, the positive correlation includes a positive proportional relationship. Correspondingly, the computer device determines the corresponding number of simulated reflections based on a preset positive proportional coefficient between the simulated traveling distance and the number of simulated reflections as well as the simulated traveling distance.

Step S210: Determine a reflection coefficient based on the environmental-spatial parameter, and respectively determine, based on the reflection coefficient, the simulated traveling distance, and the number of simulated reflections, a simulated reflection loss corresponding to each audio source.

The reflection coefficient is an energy attenuation coefficient of the audio signal, and is used for representing energy attenuation of the audio signal after sound absorption by a wall in a reflection process. The reflection coefficient is related to a simulated environment. For example, a rougher wall in the simulated environment indicates greater energy attenuation of the audio signal after sound absorption by the wall in the reflection process, and a smaller reflection coefficient. In some embodiments, the reflection coefficient may be determined based on an environmental reverberation parameter and an environmental furnishing parameter. For example, a reflection coefficient RC is empirically estimated based on an environmental reverberation parameter $T_{60}$ and an environmental furnishing parameter R.

In some embodiments, that the computer device determines a reflection coefficient based on the environmental-spatial parameter, and respectively determines, based on the reflection coefficient, the simulated traveling distance, and the number of simulated reflections, a simulated reflection loss corresponding to each audio source includes: Based on the environmental-spatial parameter, the computer device determines the reflection coefficient corresponding to the current simulated scenario, to represent an energy loss of the audio signal during each reflection under the current simulated scenario. For each audio source, the computer device determines each simulated traveling distance corresponding to the audio source and determines the number of simulated reflections that is obtained based on the simulated traveling distance. On this basis, with reference to the simulated traveling distance, the computer device may calculate a corresponding simulated reflection loss for each reflection. The simulated reflection loss represents an energy loss after reflection when a simulated sound wave propagates in space represented by the current simulated scenario.

For example, for each audio source c, the computer device determines, based on the reflection coefficient RC and the number of simulated reflections $$RR_i^c,$$

a target value of a reflected reflection coefficient RC after a number of simulated reflections $$RR_i^c,$$

and then calculates the corresponding simulated reflection loss $$RD_i^c$$

based on the target value and a simulated traveling distance $$DR_i^c.$$

Step S212: Generate a simulated impulse response under the current simulated scenario based on the simulated reflection loss corresponding to each audio source.

Based on the simulated reflection loss corresponding to each audio source, energy attenuation corresponding to each audio source at a same sampling point is determined. This can represent energy obtained by the sampling point in a process of scattering or reflection of audio signals emitted by each audio source.

In some embodiments, that the computer device generates a simulated impulse response under the current simulated scenario based on the simulated reflection loss corresponding to each audio source includes: For each audio source, the computer device determines each simulated reflection loss and adds the simulated reflection losses of audio sources corresponding to the same sampling point to obtain total energy attenuation of the audio signal corresponding to the sampling point.

An upper limit of a quantity of sampling points under the current simulated scenario may be obtained based on the preset sampling rate and a room reverberation parameter. For each audio source, the computer device can obtain, based on the preset sampling rate and the simulated traveling distance, a sampling point location corresponding to each audio source. The foregoing calculation is performed by the computer device for each sampling point, so that the simulated impulse response under the current simulated scenario can be determined based on a total simulated reflection loss corresponding to each sampling point.

In some embodiments, based on the total simulated reflection loss corresponding to each sampling point, the computer device determines an initial simulated impulse response under the current simulated scenario, and then further performs optimization to obtain a final simulated impulse response. The optimization is used for improving a presentation effect of the simulated impulse response, including but not limited to noise reduction.

In the foregoing audio signal processing method, the current simulated scenario is determined based on a scenario layout parameter. The scenario layout parameter can be adjusted to quickly simulate different room types and furnishings and cover different types of boundary space and environment types. Based on a linear distance between an audio source and a receiver set in the scenario layout parameter, various reflection paths of an audio signal from the audio source to the receiver are simulated, different reflection distances are generated, and a number of reflections are determined. This can conform to a random reflection of a real audio signal. Finally, a simulated reflection loss corresponding to each audio source under different reflection paths and different number of reflections is calculated, to generate a simulated impulse response under a current simulated scenario.

In the audio signal processing method provided in the embodiment of this application, a physical meaning of audio signal propagation is retained and randomness of an audio signal propagation path and furnishings in a room is enhanced by replacing physical modeling of a reflection model and scattering model that need a large amount of calculation. In comparison with a reflection model and a scattering model that can only model a square room, propagation of an audio signal in the physical world can be truly simulated.

The audio signal processing method provided in the embodiment of this application can approximately simulate a conventional propagation formula, and does not need to calculate numerical values of $g_i$ and $d_i$ in a transmission path of each audio signal that is reflected by the audio source and captured by the receiver in a three-dimensional coordinate system. This can greatly reduce computational complexity and improve efficiency. In addition, a reflection of a complex audio source in a room with different furnishings may be simulated. A propagation formula is as follows:

$$F[n] = \sum_{i=0}^{RT} \frac{RC^{g_i}}{d_i} \delta\left[n - \mathrm{Ceil}\left(\frac{d_i f_i}{V}\right)\right]$$

F[n] is a RIR filter, n is timestamp, RT is a number of reflections, RC is a reflection coefficient, $g_i$ is a number of reflections of $i^{th}$ reflected audio signal in a propagation process, $d_i$ is a total traveling distance of the $i^{th}$ reflected audio signal in the propagation process, δ[ ] is a unit-impulse function, $f_i$ is a sampling rate in an RIR generation process, and V is a speed of sound in the air.

In this application, room modeling is not needed, and a reflection path of each audio signal of physical simulation is not needed to be tracked and calculated, so that complexity of calculation is greatly reduced. The scenario layout parameter is adjusted and the simulated traveling distance obtained by sampling with specific distribution is combined to quickly generate a variety of simulated impulse responses, and generation efficiency is higher.

To simulate a reflection of an audio signal in a room with a large quantity of objects in an actual scenario, among the simulated traveling distances obtained by sampling, simulated traveling distances close to the linear distance are to be less, and simulated traveling distances much greater than the linear distance are to be more. In some embodiments, that the computer device determines, based on the linear distance, the simulated traveling distance corresponding to each sample at the preset sampling rate includes: obtaining a plurality of preset variable values, an occurrence probability of the plurality of preset variable values satisfying the probability density distribution function, and the probability density distribution function representing that a greater preset variable value indicates a greater occurrence probability of the corresponding preset variable value; transforming the plurality of preset variable values to determine a plurality of corresponding distance transform coefficients; and determining, based on each distance transform coefficient and the linear distance, the simulated traveling distance corresponding to each sample at the preset sampling rate.

In a sampling process, a probability of sampling satisfies the probability density distribution function. The probability density distribution function is quadratic function probability distribution, representing that a greater preset variable value indicates a greater occurrence probability of the corresponding preset variable value. In other words, a purpose of sampling using the probability density distribution function is to make a quantity of the simulated traveling distances that are among the simulated traveling distances obtained by sampling close to the linear distance is to be less, and a quantity of simulated traveling distances greater than the linear distance is to be more. For example, the probability density distribution function may be expressed by the following formula:

$$P(x) = \begin{cases} 0, \ x < \alpha \\ \dfrac{3x^2}{\beta^3 - \alpha^3}, \ \alpha \le x \le \beta \\ 0, \ x > \beta \end{cases}$$

x is the preset variable value, and α and β are the boundary parameters of probability density distribution.

In addition, to simulate a real physical law, each simulated traveling distance corresponding to each audio source is to be proportional to the linear distance between the corresponding audio source and the receiver. Therefore, in some embodiments, that the computer device determines, based on the linear distance, the simulated traveling distance corresponding to each sample at the preset sampling rate includes: At the preset sampling rate, the computer device samples based on the preset probability density distribution function, to obtain a plurality of preset variable values that follow corresponding probability density distribution. Based on the preset variable values obtained by sampling, the computer device transforms the preset variable values as bases to obtain a plurality of distance transform coefficients. For each audio source, the computer device can calculate a plurality of simulated traveling distances based on a preset linear distance and the plurality of calculated distance transform coefficients.

For example, for each audio source c, the computer device samples based on a preset value $$x_i^c$$

that follows the probability density distribution function of P(x), and obtains RT samples $$\{x_i^c\}_{i=1}^{RT},$$

where $$\alpha \le x_i^c \le \beta.$$

The simulated traveling distance $$DR_i^c$$

corresponding to each sample $$x_i^c$$

may be calculated according to the following formula:

$$DR_i^c = D_0^c \times \left(1 + \left(\frac{x_i^c}{\alpha} - 1\right) \times \frac{\alpha}{\beta - \alpha}\left(V \times \frac{T_{60}}{D_0^c} - 1\right)\right)$$

V is a speed of sound. In an example, α=0.25, and β=1. Specific values of α and β are determined according to an actual situation.

The foregoing formula may represent the proportional relationship between the simulated traveling distance and the linear distance. In other words, the simulated traveling distance $$DR_i^c$$

is a multiple of the linear distance $$D_0^c.$$

Based on the speed of sound, the environmental reverberation parameter and the linear distance, the computer device may obtain an upper limit of a multiple between the simulated traveling distance $$DR_i^c$$

and the linear distance $$D_0^c,$$

for example, the upper limit $$W = V \times T_{60} / D_0^c$$

of the multiple between the simulated traveling distance $$DR_i^c$$

and the linear distance $$D_0^c.$$

In the foregoing formula, based on the probability density distribution function followed by the preset values in the sampling process, a distribution relationship of a sampling probability may be converted into a distribution relationship of the simulated traveling distance. In other words, a value range of the preset variable value $$x_i^c$$

is [α, β]. The multiple between the simulated traveling distance and the linear distance may be obtained to be [1, W] by the foregoing conversion.

In the foregoing embodiment, by a preset probability density distribution function, and sampling based on the probability density distribution function, among the simulated traveling distances obtained by sampling, a quantity of simulated traveling distances of different lengths satisfies the probability density distribution. Therefore, the reflection of the audio signal in the room with the large quantity of objects in the actual scenario can be truly simulated, and the generated simulated impulse response is more realistic and reliable.

In the real physical law, there is to be a positive correlation between a traveling distance and a number of reflections of an audio signal. In other words, an audio signal having a long traveling distance may experience more reflections. Based on the positive correlation, the computer device can calculate a corresponding number of reflections when the traveling distance is known. Therefore, in some embodiments, as shown in FIG. 4, that the computer device determines a number of simulated reflections based on the simulated traveling distance includes:

Step S402: Determine a maximum simulated traveling distance among the simulated traveling distances corresponding to the samples.

Step S404: Determine a maximum number of simulated reflections based on a positive correlation between a traveling distance and a number of reflections of the audio signal as well as the maximum simulated traveling distance.

Step S406: Determine a distance proportional relationship between the simulated traveling distance and the maximum simulated traveling distance.

Step S408: Determine, based on the distance proportional relationship and the maximum number of simulated reflections, the number of simulated reflections corresponding to each simulated traveling distance, a reflection proportional relationship between the number of simulated reflections and the maximum number of simulated reflections being consistent with the distance proportional relationship.

The maximum number of simulated reflections represents a number of experienced reflections when energy of the audio signal is attenuated by 60 dB. Based on the positive correlation between the traveling distance and the number of the reflections, there is also a positive correlation between the maximum number of simulated reflections and the maximum simulated traveling distance. Therefore, in simulated traveling distances obtained by sampling, the computer device can determine the maximum number of simulated reflections by determining the maximum simulated traveling distance. Based on the distance proportional relationship between the simulated traveling distance and the maximum simulated traveling distance as well as the maximum number of simulated reflections, the computer device may calculate the number of simulated reflections corresponding to each simulated traveling distance.

In some embodiments, that the computer device determines a number of simulated reflections based on the simulated traveling distance includes: For each audio source, among the simulated traveling distance corresponding to each sample obtained by sampling, the computer device finds a maximum value among the simulated traveling distances, used as the maximum simulated traveling distance. Based on the distance proportional relationship between the simulated traveling distance and the maximum simulated traveling distance, the computer device can determine the reflection proportional relationship between the number of simulated reflections and the maximum number of simulated reflections, and calculate, based on the reflection proportional relationship and the maximum number of simulated reflections, the number of simulated reflections corresponding to the simulated traveling distance.

The reflection proportional relationship between the number of simulated reflections and the maximum number of simulated reflections is consistent with the distance proportional relationship. For example, the reflection proportional relationship and the distance proportional relationship may be equal, in a multiple relationship, or the like.

For example, for each audio source c, the computer device finds a maximum simulated traveling distance $$\max(\{DR_i^c\}_{i=1}^{RT})$$

among a plurality of simulated traveling distances $$\{DR_i^c\}_{i=1}^{RT}$$

obtained by sampling. Based on a reflection coefficient RC that represents energy attenuation of an audio signal and a linear distance $$D_0^c$$

between the audio source and a receiver, the computer device may calculate a maximum number of simulated reflections $$RR^c_{max}$$

corresponding to the audio source. For example, the maximum number of simulated reflections $$RR^c_{max}$$

may be calculated according to the following formula:

$$RR^c_{max} = \left(\log_{10}\max\left(\{DR^c_i\}^{RT}_{i=1}\right) - \log_{10}D^c_0 - 3\right)/\log_{10}RC$$

Based on the simulated traveling distance and the maximum traveling distance, the computer device may calculate the distance proportional relationship between the simulated traveling distance and the maximum traveling distance. For example, the distance proportional relationship between the simulated traveling distance and the maximum traveling distance may be expressed as $$DR^c_i \big/ \max\left(\{DR^c_i\}^{RT}_{i=1}\right).$$

For each audio source c, based on the distance proportional relationship between the simulated traveling distance and the maximum simulated traveling distance, the computer device may calculate the number of simulated reflections $$RR^c_i$$

corresponding to the simulated traveling distance according to the following formula:

$$RR^c_i = 1 + \left(DR^c_i/\max\left(\{DR^c_i\}^{RT}_{i=1}\right)\right)^2 * (RR^c_{max} - 1)$$

In the foregoing formula, when the simulated traveling distance is the maximum simulated traveling distance, that is, $$DR^c_i = \max\left(\{DR^c_i\}^{RT}_{i=1}\right),$$

the number of calculated simulated reflections $$RR^c_i$$

is the maximum number of simulated reflections $$RR^c_{max}.$$

The reflection proportional relationship between the number of simulated reflections and the maximum number of simulated reflections may be expressed as $$RR^c_i / RR^c_{max}.$$

In the foregoing formula, the reflection proportional relationship is appropriately deformed, that is, $$(RR^c_i - 1)/(RR^c_{max} - 1),$$

to ensure that a value of the number of simulated reflections obtained by simulating is between 1 and the maximum number of simulated reflections $$RR^c_{max}.$$

In other words, a value range of the number of simulated reflections is $$[1, RR^c_{max}].$$

In the foregoing embodiment, based on the positive correlation between the number of reflections and the traveling distance, the corresponding maximum number of simulated reflections is determined based on the maximum simulated traveling distance, to simulate a reflection of an audio signal in the real physical world, where an audio signal having a long traveling distance may experience more reflections. In addition, based on the distance proportional relationship and the reflection proportional relationship, a number of reflections corresponding to each audio signal can be obtained. Therefore, various reflections of the audio signal can be quickly simulated based on the sampled samples. This brings high efficiency and can ensure that the simulated impulse response obtained by simulating conforms to a real physical scenario. Randomly generating the simulated traveling distance and determining the number of simulated reflections avoid complex simulation calculation for each propagation path of the audio signal one by one in conventional physical simulations, so that efficiency is high.

Figure 5:
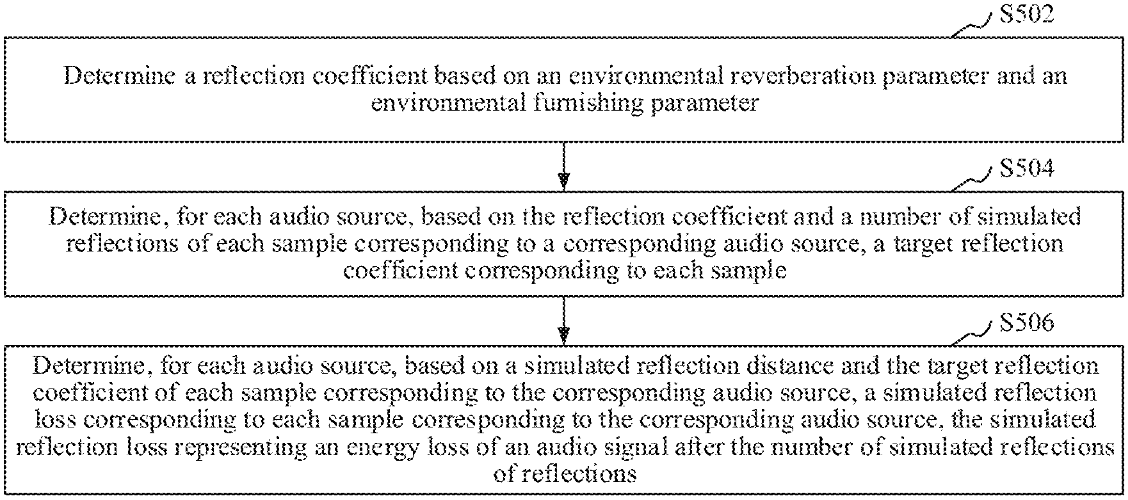
FIG. 5 is a schematic flowchart of steps of determining a simulated reflection loss according to some embodiments.

In some embodiments, as shown in FIG. 5, that the computer device determines a reflection coefficient based on an environmental-spatial parameter, and respectively determines, based on the reflection coefficient, the simulated traveling distance, and the number of simulated reflections, a simulated reflection loss corresponding to each audio source includes:

Step S502: Determine the reflection coefficient based on the environmental reverberation parameter and the environmental furnishing parameter.

Step S504: Determine, for each audio source, based on the reflection coefficient and the number of simulated reflections of each sample corresponding to a corresponding audio source, a target reflection coefficient corresponding to each sample.

Step S506: Determine, for each audio source, based on a simulated reflection distance and the target reflection coefficient of each sample corresponding to the corresponding audio source, the simulated reflection loss corresponding to each sample corresponding to the corresponding audio source, the simulated reflection loss representing an energy loss of an audio signal after being reflected by the number of simulated reflections.

The reflection coefficient is different in different environmental scenarios. In some embodiments, the computer device determines the reflection coefficient based on the environmental reverberation parameter and the environmental furnishing parameter. For example, the reflection coefficient RC may be calculated according to the following formula:

$$RC = \sqrt{1 - \left(1 - e^{-0.16\times\frac{R}{T60}}\right)^2}$$

Based on a property that the reflection coefficient is used to reflect energy attenuation of the audio signal at each reflection, for each audio signal, the computer device may obtain different reflection losses based on different number of the reflections. In some embodiments, for each audio source, the computer device determines, based on the reflection coefficient and the number of simulated reflections of each sample corresponding to the audio source, the target reflection coefficient corresponding to each sample, to represent a change of an energy attenuation coefficient of the audio signal after being reflected by the number of simulated reflections. Therefore, based on the target reflection coefficient and the simulated reflection distance of each sample, the computer device can calculate and determine the simulated reflection loss corresponding to each sample corresponding to the corresponding audio source, to represent an energy loss of the audio signal after being reflected by the number of simulated reflections.

For example, for each audio source c, the computer device calculates the target reflection coefficient $$RC^{RR_i^c}$$

based on the reflection coefficient RC and the number of simulated reflections $$RR_i^c,$$

and then calculates the simulated reflection loss $$RD_i^c$$

corresponding to each sample corresponding to the corresponding audio source according to the following formula:

$$RD_i^c = RC^{RR_i^c} / DR_i^c$$

In the foregoing embodiment, under the current simulated scenario, for each reflected audio signal of each audio source, the simulated reflection loss of the reflected audio signal after being reflected by the number of simulated reflections is simulated, a complex simulation calculation process of calculating the reflection path and the number of the reflections of each audio signal one by one in the conventional physical simulations is avoided. The simulated reflection loss is calculated by randomly generating the simulated traveling distance and determining the number of simulated reflections, so that efficiency is high.

During a reflection of an audio signal, the following situations may occur: Audio signals having a same traveling distance that belongs to different reflection paths, so the audio signals may have different number of reflections and energy attenuation. In addition, in the real physical world, the audio signal is scattered randomly in a room, so that the traveling distance and the number of the reflections are also random. Therefore, to simulate the foregoing situation and enhance randomness of the simulated audio signal, in some embodiments, after the computer device determines the number of simulated reflections based on the simulated traveling distance, the audio signal processing method provided in the embodiment of this application further includes the following steps: updating the number of determined simulated reflections based on random reflection fluctuations to obtain a number of simulated reflections with the added random reflection fluctuations, the random reflection fluctuations being obtained based on random sampling in preset uniform distribution. The random reflection fluctuations are used for simulating a property of "random" of the audio signal when the audio signal scatters in a room.

To make the simulated audio signal have strong randomness, uniform distribution having an upper boundary and a lower boundary may be preset, and random sampling is performed in the uniform distribution to obtain the random reflection fluctuations. The random reflection fluctuations are used for simulating randomness of a sound wave when the sound wave is reflected in the real physical world. The computer device updates the number of simulated reflections based on the random reflection fluctuations to obtain the number of simulated reflections with the added random reflection fluctuations, to simulate more random simulated reflection losses.

In some embodiments, for each audio source, the computer device obtains a plurality of random reflection fluctuations by random sampling, and uses the random reflection fluctuations to update the number of determined simulated reflections, thereby obtaining the number of simulated reflections with the added random reflection fluctuations.

For example, the computer device randomly generates random reflection fluctuations $$RRT_i^c$$

for each audio source c. The random reflection fluctuations $$RRT_i^c$$

follow the preset uniform distribution, that is $$RRT_i^c$$

~U(−2,2), i=1, . . . , RT. ~U(−2,2) represents random sampling in the uniform distribution having an upper boundary of 2 and a lower boundary of 2.

Therefore, for the number of determined simulated reflections $$RR_i^c,$$

the computer device may update the number of determined simulated reflections according to the following formula:

$$RR_i^c = RR_i^c + RRT_i^c * (DR_i^c)^{\theta}$$

θ is a parameter related to the simulated traveling distance during updating, for example, a value may be 0.25.

In a process of analogy assignment of the foregoing formula, a number of simulated reflections $$RR_i^c$$

on the left side of the formula is the number of simulated reflections with the added random reflection fluctuations after the update, and a number of simulated reflections $$RR_i^c$$

on the right side of the formula is the number of simulated reflections calculated and determined before the update.

Correspondingly, that the computer device determines a reflection coefficient based on the environmental-spatial parameter, and respectively determines, based on the reflection coefficient, the simulated traveling distance, and the number of simulated reflections, a simulated reflection loss corresponding to each audio source includes: determining the reflection coefficient based on the environmental-spatial parameter, and respectively determining, based on the reflection coefficient, the simulated traveling distance, and the number of simulated reflections with the added random reflection fluctuation, the simulated reflection loss corresponding to each audio source. Specifically, after step S206, the computer device increases fluctuations to the number of determined simulated reflections, to obtain the number of simulated reflections with the added random reflection fluctuations. Correspondingly, when step S208 is performed, the computer device calculates the simulated reflection loss based on the number of simulated reflections with the added random reflection fluctuations. Similarly, when a computer device performs steps S504 to S506, the number of used simulated reflections may alternatively be the number of simulated reflections with the added random reflection fluctuations. For specific processes and steps, refer to the foregoing embodiment.

In the foregoing embodiment, the simulated audio signal has strong randomness by randomly generating the random reflection fluctuations corresponding to each audio source. The reflection of the simulated audio signal is realistic and conforms to the reflection and scattering of the audio signal in the real physical world, so that the generated simulated impulse response is more realistic.

Figure 6:
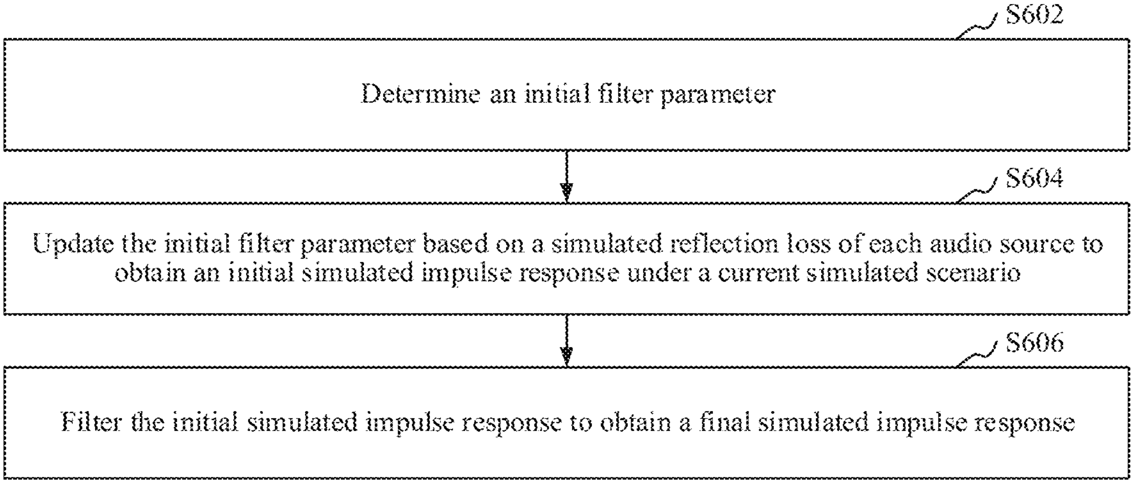
FIG. 6 is a schematic flowchart of steps of generating a simulated impulse response according to some embodiments.

After a plurality of simulated reflection losses corresponding to each audio source are determined, in some embodiments, as shown in FIG. 6, that the computer device generates a simulated impulse response under the current simulated scenario based on the simulated reflection loss corresponding to each audio source includes:

Step S602: Determine an initial filter parameter.

Step S604: Update the initial filter parameter based on the simulated reflection loss corresponding to each audio source to obtain an initial simulated impulse response under the current simulated scenario.

Step S608: Filter the initial simulated impulse response to obtain a final simulated impulse response.

As mentioned above, the room impulse response is a finite impulse response filter that measures a delay and energy attenuation of an original audio caused due to sound attenuation and reflection when the sound propagates in closed or semi-open space. After the simulated reflection loss is obtained, the filter outputs the simulated impulse response based on the simulated reflection loss and a filter parameter.

In some embodiments, the filter parameter is usually a one-dimensional vector. The one-dimensional vector includes components corresponding to locations of sampling points at a preset sampling rate. The locations of the sampling points $$s_i^c$$

satisfy the following condition:

$$s_i^c = \min\left(\text{Ceil}\left(DR_i^c \times \frac{sr_h}{V}\right), L_{RIR} - 1\right), c = 1, \ldots, C$$

$L_{RIR}$ is an effective length of the simulated impulse response under the current simulated scenario, and may be calculated according to the following formula:

$$L_{RIR} = \text{Ceil}(sr_h \times T_{60})$$

In the foregoing formula, Ceil( ) represents a rounded-up function. At a sampling rate specified in the preset sampling rate $sr_h$, an upper limit of a quantity of the sampling points under the current simulated scenario can be obtained after time corresponding to $T_{60}$. Generally, the sampling points are uniformly distributed, so that the effective length $L_{RIR}$ of the simulated impulse response can be determined.

In some embodiments, that the computer device determines an initial filter parameter includes: The filter parameter is initialized to obtain the initial filter parameter. The computer device initializes the filter parameter by initializing the filter parameter into an all-zero vector. The all-zero vector is the initial filter parameter. For example, the filter parameter $F^c \in R^{L_{RIR}}$. For each audio source, the computer device updates based on the plurality of simulated reflection losses corresponding to the audio source, and the initial filter parameter corresponding to the audio source, to obtain the filter parameter corresponding to the audio source. The computer device accumulates values corresponding to a same sampling point in filter parameters of all audio sources, to obtain the final filter parameter, thereby determining the initial simulated impulse response under the current simulated scenario.

Specifically, for each audio source, the computer device calculates the filter parameter corresponding to the audio source, and then accumulates the simulated reflection loss corresponding to each audio source at the same sampling point to obtain a total simulated reflection loss corresponding to each sampling point, thereby determining total simulated reflection losses corresponding to all sampling points, and obtaining the initial simulated impulse response under the current simulated scenario.

For each audio source, that the computer device calculates the filter parameter corresponding to the audio source includes: For an $i^{th}$ reflection ($1 \le i \le RT$) among RT reflections of the audio source, the computer device determines a location of a corresponding sampling point of the audio source, that is, determines a location of a sampling point in the one-dimensional vector corresponding to the simulated reflection loss of the audio source. Therefore, at the corresponding location of the sampling point, the computer device assigns a value based on the simulated reflection loss, to update the initial filter parameter. Therefore, based on the simulated reflection loss of each audio source at each sampling point, the computer device accumulates to obtain the initial simulated impulse response under the current simulated scenario with a plurality of audio sources. For example, the computer device adds $$RD_i^c$$

to a value $$F^c[s_i^c]$$

in an $$s_i^{cth}$$

location of the all-zero vector $F^c$. A process of analogy assignment may be expressed according to the following formula:

$$F^c[s_i^c] = F^c[s_i^c] + RD_i^c$$

Figure 7:
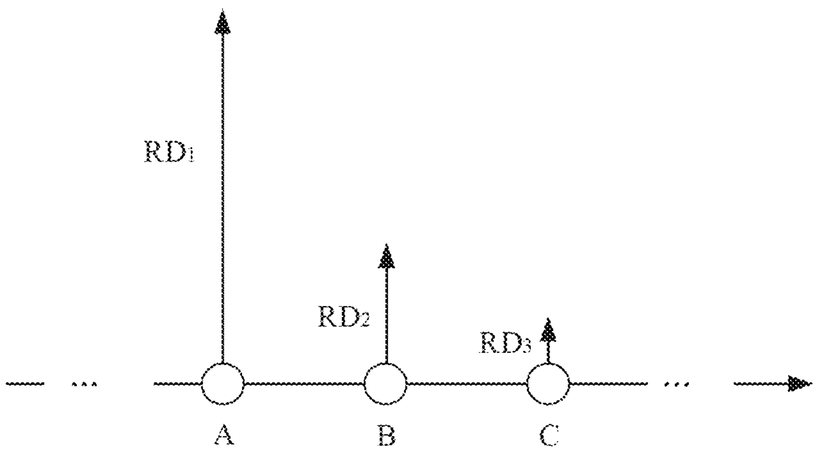
FIG. 7 is a schematic diagram of updating a filter parameter according to some embodiments.

As shown in FIG. 7, for an audio source C1, it is assumed that a corresponding simulated reflection loss at a location of a sampling point A is $RD_1$, a corresponding simulated reflection loss at a location of a sampling point B is $RD_2$, a corresponding simulated reflection loss at a location of a sampling point C is $RD_3$ . . . . Therefore, based on the simulated reflection loss of the audio signal of the audio source at each sampling point location, the audio source is assigned to a corresponding location of a sample point in the filter parameter, to update the filter parameter corresponding to the audio source.

Figure 8:
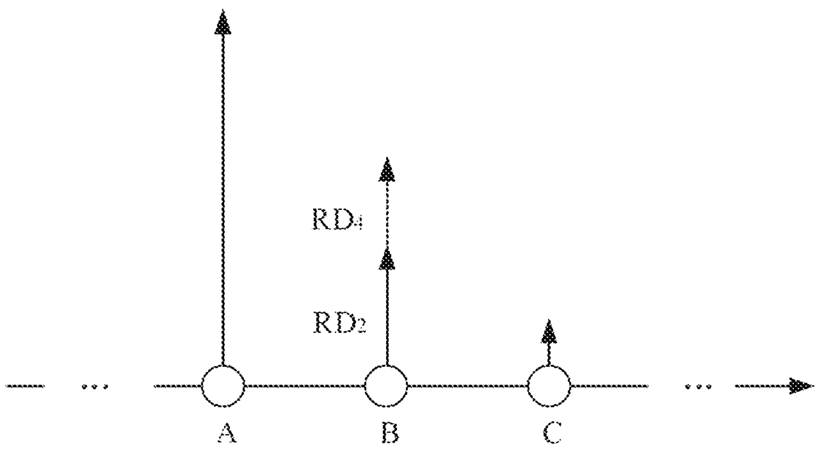
FIG. 8 is a schematic diagram of updating a filter parameter according to some other embodiments.

As shown in FIG. 8, assuming that there is a simulated reflection loss $RD_4$ corresponding to an audio source C2 at a location of a sampling point B, the computer device accumulates simulated reflection losses at the location of the sampling point B of an audio source C1 and an audio source C2 respectively, to obtain a total simulated reflection loss at the location of the sampling point B.

After obtaining the initial simulated impulse response, the computer device filters the initial simulated impulse response to optimize the initial simulated impulse response, thereby obtaining the final simulated impulse response. The filtering includes, but is not limited to, one or more of downsampling, performing wave filtering, or the like.

In the foregoing embodiment, the initial filter parameter is updated based on the determined simulated reflection loss of each audio source, a digital signal of the audio signal is processed by a filter structure to simulate a reflection of an audio signal in a real physical scenario, and energy attenuation of real collection of the audio signal is simulated by data sampled at each sampling point, to obtain the initial simulated impulse response under the current simulated scenario. The simulated audio signal reflection is more realistic and conforms to the reflection and scattering of the audio signal in the real physical world, so that the generated simulated impulse response is more realistic.

As mentioned above, sampling at a high sampling rate can capture an effect of a subtle change in a location of the audio source on the simulated impulse response. Because sampling is initially performed at a high sampling rate (where the preset sampling rate is the high sampling rate), an amount of data obtained by sampling is large. In addition, there may be noise data in the data obtained by sampling at the high sampling rate, so that the simulated impulse response is generally processed by performing wave filtering. However, if the data obtained by sampling at the high sampling rate is directly performed wave filtering, an amount of computation is large, resulting in low efficiency. Therefore, to reduce the amount of data computation and improve efficiency, in some embodiments, the filtering the initial simulated impulse response to obtain a final simulated impulse response includes: sampling the initial simulated impulse response at a first sampling rate to obtain a first simulated impulse response; performing wave filtering on the first simulated impulse response at a preset break frequency to obtain a second simulated impulse response; and downsampling the second simulated impulse response at a second sampling rate to obtain the final simulated impulse response, the preset sampling rate being greater than the first sampling rate, and the first sampling rate being greater than the second sampling rate.

The preset sampling rate is a highest sampling rate. The first sampling rate is a medium sampling rate. The second sampling rate is a lowest sampling rate. Generally, the second sampling rate is a target sampling rate.

The computer device downsamples the initial simulated impulse response, reduces a sampling rate from the preset sampling rate to the first sampling rate, and uses the simulated impulse response after the first downsampling as the first simulated impulse response.

If a sampling rate at which the simulated impulse response is sampled is directly reduced to the lowest target sampling rate (that is, the second sampling rate) and then performed wave filtering, causing a finally simulated impulse response to be incomplete or inaccurate due to loss and distortion associated with the wave filtering. Therefore, after the first simulated impulse response is obtained by the first downsampling, the computer device first performs wave filtering to obtain the second simulated impulse response. In other words, for the first simulated impulse response obtained by reducing the sampling rate, the computer device performs wave filtering on the first simulated impulse response and performs wave filtering on the first simulated impulse response at a preset break frequency to obtain the second simulated impulse response. For example, the computer device performs high-pass filtering on the first simulated impulse response using a high-pass filtering having a preset break frequency of 80 HZ. The computer device then downsamples the second simulated impulse response, and the sampling rate is further reduced to the second sampling rate, to obtain the final simulated impulse response at the target sampling rate.

For example, for the initial simulated impulse response, the computer device performs a downsampling operation on the initial simulated impulse response, reduces the sampling rate from $sr_h$ to the first sampling rate $sr_l$, to obtain an updated simulated impulse response $$F_l^c,$$

that is, the first simulated impulse response. The computer device then uses the high-pass filter to filter the first simulated impulse response $$F_l^c$$

to obtain an updated simulated impulse response $$F_p^c,$$

that is, the second simulated impulse response. Finally, the computer device performs the downsampling operation on the second simulated impulse response $$F_p^c,$$

reduces the sampling rate from the first sampling rate $sr_l$ to the target second sampling rate sr, to obtain an updated simulated impulse response $$F_t^c. F_t^c$$

is the final simulated impulse response.

In the foregoing embodiment, the simulated impulse response is optimized to generate a more accurate simulated impulse response, and processing of massive data can be directly avoided, thereby reducing an amount of data, and improving generation efficiency.

In the audio signal processing method provided in the embodiment of this application, a large quantity of simulated impulse responses may be generated quickly. In some embodiments, when the simulated impulse response is generated based on a specific scenario layout parameter, an impulse response of a sound wave in a room indicated by the scenario layout parameter is simulated. Furthermore, after the simulated impulse response is generated, the computer device can directly superimpose the generated simulated impulse response on an external input audio signal, thereby generating an audio signal with a reverberation effect. The simulated impulse response may be used in a variety of scenarios, such as generating an audio signal with reverberation by mixing the simulated impulse response with an original audio signal, to train an audio processing model as input of various audio processing models. Alternatively, the audio signal with reverberation is generated based on the original audio signal, to achieve a reverberation effect of audio. In comparison with the original audio signal, the audio signal with reverberation can bring a listener the reverberation effect.

In some embodiments, after generating the simulated impulse response, the computer device may mix the simulated impulse response with the original audio signal to generate the audio signal with reverberation. Based on this, the method further includes: obtaining a target audio signal; and performing convolution processing on the target audio signal based on the simulated impulse response, to generate a target audio signal with reverberation. The target audio signal refers to a given audio signal to be added with a reverberation effect, such as a piece of speech or a piece of music.

Specifically, the computer device obtains the target audio signal, and based on the generated simulated impulse response, the computer device performs the convolution processing on the generated simulated impulse response with the target audio signal, to generate the target audio signal with reverberation.

In a practical scenario, the computer device may be one or more of devices such as a mobile phone, a computer, a conventional speaker, a smart speaker, or a reverberant unit used in a place such as a dance hall, a singing studio, or a recording studio.

Using a speaker as an example, a user may transmit the target audio signal to the speaker by using a mobile phone APP for controlling the speaker, or a data input interface provided by the speaker. For example, the user transmits a piece of music to the speaker in a form of wireless transmission by using the mobile phone APP. Alternatively, the user transmits a piece of music to the speaker in a form of wired transmission via an audio cable.

After the speaker obtains the target audio signal, the simulated impulse response is generated by performing the audio signal processing method, and the convolution processing is performed, based on the generated simulated impulse response, on the target audio signal based on user input, to generate the target audio signal with reverberation. After that, for example, the speaker plays the target audio signal with reverberation via a speaker unit, to simulate music with a reverberation effect, and the like.

In addition, the user may also adjust the scenario layout parameter by entering different scenario layout parameters on the mobile phone APP, or by the speaker's own mediation components, to quickly simulate a reverberation effect in different room space.

When the speaker performs the foregoing method, the method can be implemented by using a plurality of hardware units such as a sound unit, a filter unit, or a loudspeaking unit inside the speaker, or by an integrated circuit. The audio signal processing method can also be integrated as program code, and stored in a memory of an internal circuit of the speaker in the form of software, so that a processor in the internal circuit of the speaker can call the program code, to simulate a sound effect of the audio signal with reverberation.

By adjusting the scenario layout parameter and with reference to a reflection and scattering of the simulated audio signal, the computer device may quickly generate a simulated impulse response for a variety of room types.

Furthermore, for the target audio signal, the computer device may quickly generate a large quantity of target audio signals with different degrees of reverberation by adjusting the scenario layout parameter.

In some embodiments, the large quantity of target audio signals with reverberation are quickly generated according to the foregoing method. A large quantity of trained samples may be provided at a dataset preparation stage of the audio processing model. This provides strong data support for a subsequent model training process. In addition, the target audio signal with reverberation generated according to the foregoing method is real and reliable, and accuracy of a trained audio processing model can be improved.

Using the generated target audio signal with reverberation for a training process of the audio processing model as an example, in some embodiments, the method further includes: adding noise to the target audio signal with reverberation to obtain training data; determining a reference audio signal corresponding to the training data, the reference audio signal including at least one of a denoised audio signal with reverberation and an audio signal without reverberation and noise, the denoised audio signal with reverberation being an audio signal with a reverberation effect and no noise, and the audio signal without reverberation and noise being an audio signal without a reverberation effect and noise; and training a target audio processing model based on the training data and the corresponding reference audio signal to obtain a trained audio processing model.

In some embodiments, the audio processing model is configured to perform light denoising on audio, that is, to remove noise from the audio signal. Therefore, the computer device adds noise to the audio signal with reverberation to obtain the training data. The computer device determines the reference audio signal corresponding to the training data. The reference audio signal is an audio signal with reverberation obtained in advance before the noise is added, that is, the denoised audio signal with reverberation. The reference audio signal is used as a reference standard to be compared with the target audio signal with reverberation and noise, to test a denoising effect of the target audio signal with reverberation and added noise.

Therefore, the computer device trains the target audio processing model based on the training data and the denoised audio signal with reverberation to obtain the trained audio processing model. For example, the computer device inputs the training data into the target audio processing model, and the target audio processing model outputs a predicted audio signal. Therefore, the computer device minimizes a difference between the reference audio signal and the predicted audio signal as an optimization goal, and trains the target audio processing model until a training condition is reached, to obtain the trained audio processing model. For example, the training condition is one or more of the following: A quantity of training iterations reaches a preset quantity, training duration reaches preset duration, a difference between the reference audio signal and the predicted audio signal is less than a threshold, or the like.

In some other embodiments, the audio processing model is configured to perform deep denoising on the audio, that is, to remove noise from the audio signal and to remove late reverberation from the audio signal. Therefore, the computer device adds noise to the target audio signal with reverberation to obtain the training data. The computer device determines the reference audio signal corresponding to the training data. The reference audio signal is a to-be-processed audio signal obtained in advance before noise and reverberation are added, that is, the audio signal without reverberation and noise.

Therefore, the computer device trains the target audio processing model based on the training data and the denoised audio signal with reverberation to obtain the trained audio processing model. The specific training steps are similar to the foregoing steps.

In the foregoing embodiment, a to-be-reverberated audio signal is used as an input sample of the audio processing model to greatly expand a quantity of samples, so that enhanced processing for the samples can be implemented, thereby helping improve accuracy of the audio processing model.

In a practical application scenario, the audio processing model may be configured to de-noise and de-reverb a given audio signal, or to output audio with a reverberation effect for the given audio signal. For example, in a music separation task, voice audio needs to be separated from accompaniment audio to obtain pure voice audio or pure accompaniment audio. The voice audio refers to a part of audio that is emitted by humans, animals, or the like, and that is in an audio signal. The accompaniment audio refers to apart of audio emitted by instruments in an audio signal. For example, if the audio signal is a song, a part sung by a person is the voice audio, and a part played by an instrument is the accompaniment audio. In some embodiments, the method further includes: obtaining to-be-processed music, a target audio signal including a voice audio signal and an accompaniment audio signal; and inputting the target audio signal into the trained audio processing model, and separating the voice audio signal from the accompaniment audio signal in the target audio signal via the trained audio processing model to obtain a pure voice audio signal and a pure accompaniment audio signal.

Specifically, the computer device obtains the target audio signal and inputs target audio signal to the trained audio processing model. The trained audio processing model processes the target audio signal, separates the voice audio signal from the accompaniment audio signal in the target audio signal, and outputs the pure voice audio signal and the pure accompaniment audio signal, or inputs the pure voice audio signal and the pure accompaniment audio signal separately. For example, the accompaniment audio signal is regarded as noise and is processed by the trained audio processing model, to output a voice audio signal with reverberation or a voice audio signal without reverberation, or the like.

Therefore, the foregoing method can be applied in the field of music to implement rapid separation of the voice audio signal and the accompaniment audio signal, and separation accuracy is high.

This application further provides an application scenario. The application scenario applies the audio signal processing method. Specifically, an application example of the audio signal processing method in the application scenario is as follows: A terminal obtains a scenario layout parameter that corresponds to a current simulated scenario and that is set by a user, and determines a reflection coefficient based on an environmental-spatial parameter in the scenario layout parameter, to determine an energy attenuation coefficient under the current simulated scenario. Based on a linear distance in the scenario layout parameter, the terminal samples a plurality of simulated traveling distances at a preset sampling rate, and then calculates a number of simulated reflections based on the simulated traveling distances obtained by sampling. Based on the reflection coefficient, the simulated traveling distances, and the number of simulated reflections, the terminal can determine a simulated reflection loss corresponding to each audio source and generate a simulated impulse response under the current simulated scenario. Certainly, this is not limited thereto. The audio signal processing method provided in this application can also be applied to other application scenarios, such as one or more of music playback, online livestreaming, an online conference, in-vehicle intelligent dialog, a smart speaker, a smart top box, or human voice simulation.

In some embodiments, the audio signal processing method provided in this application may also be embedded in various devices having audio input or output, such as microphones or noise reduction headsets, in a manner of integrated code.

In a specific embodiment, the audio signal processing method includes the following steps: The computer device obtains a scenario layout parameter corresponding to a current simulated scenario, the scenario layout parameter including a linear distance $$D_0^c$$

between a receiver and at least one audio source, an environmental reverberation parameter $T_{60}$, and an environmental furnishing parameter R. Based on the environmental reverberation parameter $T_{60}$ and the environmental furnishing parameter R, the computer device can calculate a reflection coefficient RC under the current simulated scenario based on an empirical estimation.

At the beginning, for each audio source, the computer device samples under a condition of following probability density distribution P(x) according to a preset probability density distribution function, to obtain a plurality of preset variable values $$x_i^c.$$

For each audio source c, the computer device samples RT samples $$\{x_i^c\}_{i=1}^{RT}$$

with a probability of P(x), where α≤

$$x_i^c$$

≤β.

The computer device determines a plurality of corresponding distance transform coefficients based on the plurality of preset variable values $$x_i^c$$

to calculate, based on each distance transform coefficient and the linear distance $$D_0^c,$$

a simulated traveling distance $$\{DR_i^c\}_{i=1}^{RT}$$

corresponding to each sample at a preset sampling rate $sr_h$.

According to the foregoing sampling method, a difference between the simulated traveling distance and the linear distance obtained by sampling can satisfy a preset distribution condition. In other words, simulated traveling distances close to the linear distance are less, and simulated traveling distances greater than the linear distance are more.

Among simulated traveling distances obtained by sampling, the computer device determines a maximum simulated traveling distance $$\max\left(\{DR_i^c\}_{i=1}^{RT}\right),$$

and determines a maximum number of simulated reflections $$RR_{max}^c$$

based on a positive correlation between a traveling distance and a number of reflections of an audio signal. Therefore, based on a distance proportional relationship between the simulated traveling distance and the maximum simulated traveling distance, and a reflection proportional relationship between the number of simulated reflections and the maximum number of simulated reflections, a number of simulated reflections $$RR_i^c$$

corresponding to each simulated traveling distance can be determined.

To enhance randomness, for a number of calculated simulated reflections, the computer device adds random reflection fluctuations to the number of simulated reflections by randomly sampling in preset uniform distribution.

Therefore, based on a number of simulated reflections $$RR_i^c$$

with the added random reflection fluctuations, the computer device determines, based on the reflection coefficient RC, a target reflection coefficient $$RC^{RR_i^c}$$

corresponding to each sample, and then obtains, based on the target reflection coefficient $RC^{RR_i^c}$ and each simulated reflection distance $DR_i^c$, a simulated reflection loss $RD_i^c$ corresponding to each sample.

For the simulated reflection loss $RD_i^c$ corresponding to each sample corresponding to each audio source, the computer device determines, in an initialization all-zero vector of a filter parameter, a total simulated reflection loss corresponding to a location of each sampling point accumulatively by determining simulated reflection losses of different audio sources corresponding to the location of each sampling point $s_i^c$ to obtain an initial simulated impulse response.

To further optimize the simulated impulse response, the computer device first downsamples the initial simulated impulse response at a first sampling rate $sr_i$ to obtain a first simulated impulse response; then performs high-pass filtering on the first simulated impulse response to obtain a second simulated impulse response; and finally, downsamples the second simulated impulse response at a second sampling rate sr to obtain a final simulated impulse response.

After obtaining the simulated impulse response, the computer device can perform convolution processing on the simulated impulse response with a given piece of audio signal to obtain an audio signal with reverberation. The scenario layout parameter is adjusted to quickly generate a large quantity of audio signals with different degrees of reverberation. The large quantity of generated audio signals with different degrees of reverberation may be used in a training task of the audio processing model, so that a training sample can be obtained without collecting from a real environment, thereby greatly improving training efficiency of the audio processing model.

in embodiments of this application, there is no hard limit on a numerical value of input-related parameters involved, and the specific numerical value can be determined according to an actual situation. In a specific example, the set parameters may be: a preset sampling rate $sr_h$=sr*64, a first sampling rate $sr_l$=sr*8, and a second sampling rate sr=16000. For each audio source c, a value range of a linear distance $\{D_0^c\}_{c=1}^C$ between the audio source and a receiver is [0.2 m, 12 m]. A value range of a room reverberation parameter $T_{60}$ is [0.1, 1.5]. After $T_{60}$ is selected, a value range of a room furnishing parameter R is [0.1, $T_{60}$]. A speed of sound V=340. A number of simulated reflections RT=sr*2.

In some embodiments, data with reverberation generated according to the audio signal processing method provided in the embodiment of this application is used as a sample to train a model. The following performance data can be obtained by testing with synthesized audio with reverberation using actual collected impulse responses (as shown in Table 1):

TABLE 1

| Impulse response simulation method | PESQ | Training speed (min/epoch) |
|---|---|---|
| Present solutions | 2.18 | 114 |
| RIR_Generator | 2.08 | — |
| PyRoomAcoustics | 1.92 | 320 |

RIR_Generator and PyRoomAcoustics are the most commonly used impulse response generation methods in the industry. Simulated impulse response data is generated according to the foregoing three methods and used as training data for a training process of the model. In a process of performance testing, only when the training data is generated, a same training mode and model are used to generate the audio signal with reverberation using different simulated impulse response simulation methods.

Perceptual evaluation of speech quality (PESQ) is used as a performance evaluation indicator to represent a degree of closeness of a generated audio signal with reverberation to real audio. Higher PESQ indicates that the generated audio is closer to the real audio, so that a listening effect is better.

It can be learned that in the audio signal processing method provided in the embodiment of this application, the model can have a better model performance while training speed is greatly improved, showing high efficiency and effectiveness of the method.

It is to be understood that, although the steps are displayed sequentially according to instructions of arrows in the flowcharts of the embodiments, these steps are not necessarily performed sequentially according to a sequence instructed by the arrows. Unless otherwise explicitly specified in this application, execution of the steps is not strictly limited, and the steps may be performed in other sequences. In addition, at least some steps in the flowcharts of the embodiments may include a plurality of steps or a plurality of stages, and these steps or stages are not necessarily performed at a same moment, and may be performed at different moments. These steps or stages are not necessarily performed in sequence, but may be performed in turn or alternately with other steps or at least some of the steps or stages in other steps.

According to a same inventive concept, the embodiments of this application further provide an audio signal processing apparatus for implementing the audio signal processing method. An implementation solution provided by the apparatus to resolve the problem is similar to an implementation solution described in the method. Therefore, specific limitations in one or more embodiments of the audio signal processing apparatus provided below can refer to the limitations of the audio signal processing method described above. Details are not described herein again.

Figure 9:
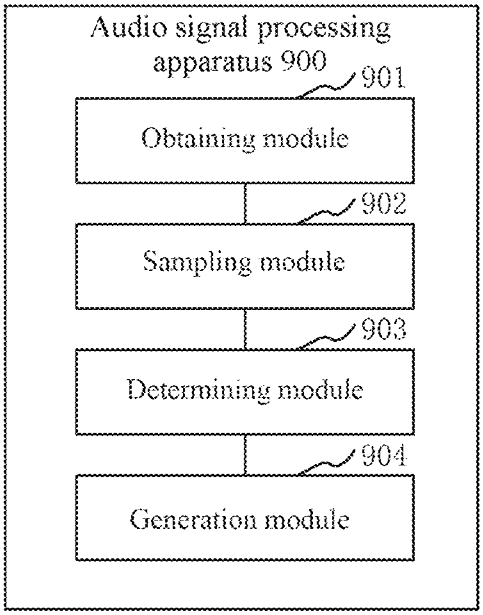
FIG. 9 is a block diagram of a structure of an audio signal processing apparatus according to some embodiments.

In some embodiments, as shown in FIG. 9, an audio signal processing apparatus is provided, including: an obtaining module 901, a sampling module 902, a determining module 903, and a generation module 904.

The obtaining module 901 is configured to obtain a scenario layout parameter corresponding to a current simulated scenario, the scenario layout parameter including a linear distance between a receiver and at least one audio source as well as an environmental-spatial parameter.

The sampling module 902 is configured to sample, at a preset sampling rate, an audio signal emitted by at least one audio source to obtain at least one sample.

The sampling module 902 is further configured to determine, based on the linear distance, a simulated traveling distance corresponding to each sample at the preset sampling rate, a difference between each simulated traveling distance obtained by sampling and the linear distance satisfying a preset distribution condition.

The determining module 903 is configured to determine a number of simulated reflections based on the simulated traveling distance, the number of simulated reflections being positively correlated with the simulated traveling distance.

The determining module 903 is further configured to determine a reflection coefficient based on an environmental-spatial parameter, and respectively determine, based on the reflection coefficient, the simulated traveling distance, and the number of simulated reflections, a simulated reflection loss corresponding to each audio source.

The generation module 904 is configured to generate a simulated impulse response under the current simulated scenario based on the simulated reflection loss corresponding to each audio source.

In some embodiments, the sampling module is further configured to obtain a plurality of preset variable values, an occurrence probability of the plurality of preset variable values satisfying the probability density distribution function, and the probability density distribution function representing that a greater preset variable value indicates a greater occurrence probability of the corresponding preset variable value; determine a plurality of corresponding distance transform coefficients based on the plurality of preset variable values; and determine, based on each distance transform coefficient and the linear distance, the simulated traveling distance corresponding to each sample at the preset sampling rate.

In some embodiments, that the determining module is further configured to determine a number of simulated reflections based on the simulated traveling distance includes: determining a maximum simulated traveling distance among the simulated traveling distances corresponding to the samples; determining a maximum number of simulated reflections based on a positive correlation between a traveling distance and a number of reflections of the audio signal as well as the maximum simulated traveling distance; determining a distance proportional relationship between the simulated traveling distance and the maximum simulated traveling distance; and determining, based on the distance proportional relationship and the maximum number of simulated reflections, the number of simulated reflections corresponding to each simulated traveling distance, a reflection proportional relationship between the number of simulated reflections and the maximum number of simulated reflections being consistent with the distance proportional relationship.

In some embodiments, the apparatus further includes a disturbance module, the disturbance module is connected to the determining module, and the disturbance module being configured to update the number of determined simulated reflections based on random reflection fluctuations to obtain a number of simulated reflections with the added random reflection fluctuations, the random reflection fluctuations being obtained based on random sampling in preset uniform distribution.

Correspondingly, the determining module is further configured to determine the reflection coefficient based on the environmental-spatial parameter, and respectively determine, based on the reflection coefficient, the simulated traveling distance, and the number of simulated reflections with the added random reflection fluctuations, the simulated reflection loss corresponding to each audio source.

In some embodiments, the environmental-spatial parameter includes an environmental reverberation parameter and an environmental furnishing parameter. The determining module is further configured to determine the reflection coefficient based on the environmental reverberation parameter and the environmental furnishing parameter; determine, for each audio source, based on the reflection coefficient and the number of simulated reflections of each sample corresponding to a corresponding audio source, a target reflection coefficient corresponding to each sample; and determine, for each audio source, based on a simulated reflection distance and the target reflection coefficient of each sample corresponding to the corresponding audio source, the simulated reflection loss corresponding to each sample corresponding to the corresponding audio source, the simulated reflection loss representing an energy loss of an audio signal after being reflected by the number of simulated reflections.

In some embodiments, the generation module is further configured to determine an initial filter parameter; update the initial filter parameter based on the simulated reflection loss of each audio source to obtain an initial simulated impulse response under the current simulated scenario; and filter the initial simulated impulse response to obtain a final simulated impulse response.

In some embodiments, the generation module is further configured to downsample the initial simulated impulse response at a first sampling rate to obtain a first simulated impulse response; perform wave filtering on the first simulated impulse response with a preset break frequency to obtain a second simulated impulse response; and downsample the second simulated impulse response at a second sampling rate to obtain the final simulated impulse response, the preset sampling rate being greater than the first sampling rate, and the first sampling rate being greater than the second sampling rate.

In some embodiments, the apparatus further includes a convolution module, the convolution module being configured to obtain a target audio signal; and perform convolution processing on the target audio signal based on the simulated impulse response, to generate a target audio signal with reverberation.

In some embodiments, the apparatus further includes a training module, the training module being configured to add noise to the target audio signal with reverberation to obtain training data; determine a reference audio signal corresponding to the training data, the reference audio signal including at least one of a denoised audio signal with reverberation and an audio signal without reverberation and noise; and train a target audio processing model based on the training data and the corresponding reference audio signal to obtain a trained audio processing model.

In some embodiments, the apparatus further includes a music processing module, the music processing module being configured to obtain a target audio signal, and the target audio signal including a voice audio signal and an accompaniment audio signal; and input the target audio signal into the trained audio processing model, and separate the voice audio signal from the accompaniment audio signal in the target audio signal via the trained audio processing model.

Each module in the audio signal processing apparatus may be entirely or partially implemented by software, hardware, or a combination thereof. Each module can be embedded in or independent of a processor in a computer device in a form of hardware, or can be stored in a memory in the computer device in a form of software, so that the processor can call the modules to perform operations corresponding to the foregoing modules.

In some embodiments, a computer device is provided. The computer device may be a terminal, or may be a server. Using an example in which the computer device is the terminal, a diagram of an internal structure of the computer device may be shown in FIG. 10. The computer device includes a processor, a memory, an input/output interface, a communication interface, a display unit, and an input apparatus. The processor, the memory, and the input/output interface are connected via a system bus. The communication interface, the display unit, and input apparatus are connected to the system bus via the input/output interface. The processor of the computer device is used for providing computing and control capabilities. The memory of the computer device includes a non-volatile storage medium and an internal memory. The non-volatile storage medium stores an operating system and computer program. The internal memory provides an environment for running of the operating system and the computer program in the non-volatile storage medium. The input/output interface of the computer device is used for exchanging information between the processor and an external device. The communication interface of the computer device is used for wired or wireless communication with an external terminal. The wireless communication may be implemented via Wi-Fi, a mobile cellular network, near field communication (NFC), or another technology. This computer program is executed by the processor to implement an audio signal processing method. The display unit of the computer device is used for forming a visually visible picture, and may be a display, a projection device, or a virtual reality imaging apparatus. The display may be a liquid crystal display or an e-ink display. The input apparatus of the computer device may be a touch layer covering the display, or may be a button, a trackball, or a touchpad disposed on a housing of the computer device, or may be an external keyboard, a touchpad, a mouse, or the like.

Figure 10:
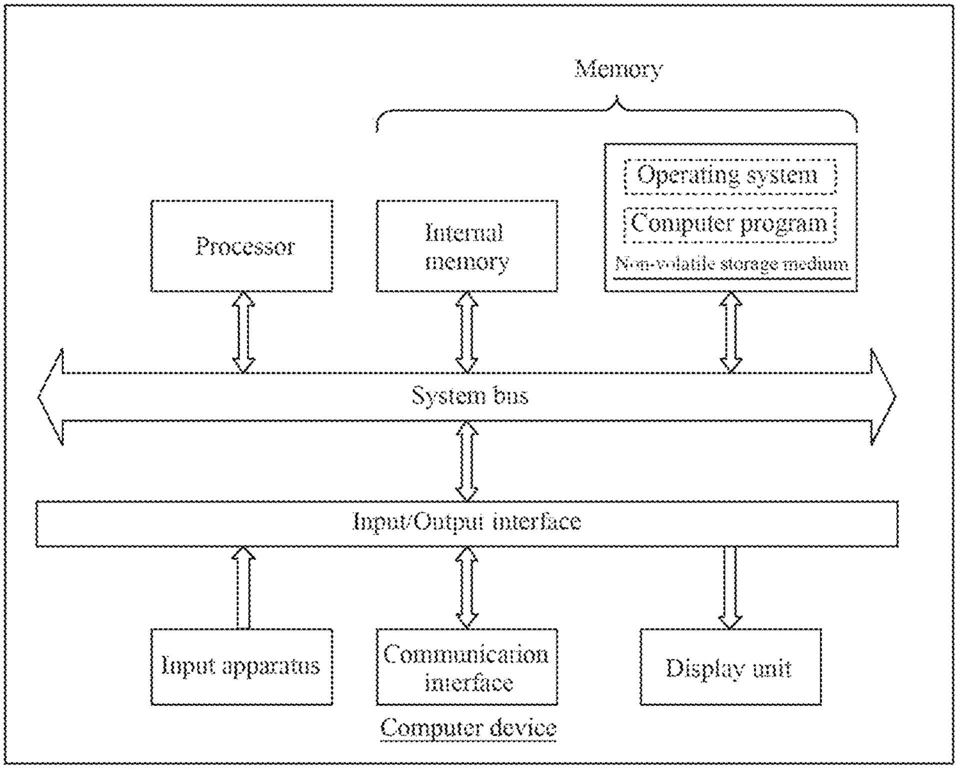
FIG. 10 is a diagram of an internal structure of a computer device according to some embodiments.

A person skilled in the art may understand that, the structure shown in FIG. 10 is merely a block diagram of a partial structure related to a solution in this application, and does not constitute a limitation to the computer device to which the solution in this application is applied. Specifically, the computer device may include more components or fewer components than those shown in the figure, or some components may be combined, or a different component deployment may be used.

In some embodiments, a computer device is provided, including a memory and a processor. The memory stores a computer program, and the processor executes the computer program to implement the steps of each method embodiment.

In some embodiments, a computer-readable storage medium is provided, having a computer program stored thereon. The computer program is executed by a processor to implement the steps of each method embodiment.

In some embodiments, a computer program product is provided, including a computer program. The computer program is executed by a processor to implement the steps of each method embodiment.

A person of ordinary skill in the art may understand that all or some of processes of the method in the foregoing embodiments may be implemented by a computer program instructing relevant hardware. The computer program may be stored in a non-volatile computer-readable storage medium. When the computer program is executed, the processes of the foregoing method embodiments may be implemented. References to the memory, the database, or other medium used in the embodiments provided in this application may all include at least one of a non-volatile or a volatile memory. The non-volatile memory may include a read-only memory (ROM), a tape, a floppy disk, a flash memory, an optical memory, a high-density embedded non-volatile memory, a resistive memory (ReRAM), a magnetoresistive random access memory (MRAM), a ferroelectric random access memory (FRAM), a phase change memory (PCM), a graphene memory, or the like. The volatile memory may include a random access memory (RAM), an external high-speed cache, or the like. As an illustration rather than a limitation, RAM may be in many forms, such as a static random access memory (SRAM) or a dynamic random access memory (DRAM). The database involved in the embodiments provided in this application may include at least one of a relational and non-relational database. The non-relational database may include, but is not limited to, a blockchain-based distributed database, and the like. The processor involved in the embodiments provided in this application may be, but is not limited to, a general-purpose processor, a central processing unit, a graphic processing unit, a digital signal processor, a programmable logic device, a quantum computing-based data processing logic device, and the like.

In this application, the term "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module can be implemented using one or more processors (or processors and memory). Likewise, a processor (or processors and memory) can be used to implement one or more modules. Moreover, each module can be part of an overall module that includes the functionalities of the module. Technical features of the foregoing embodiments may be randomly combined. To make description concise, not all possible combinations of the technical features in the foregoing embodiments are described. However, the combinations of these technical features shall be considered as falling within the scope recorded by this specification provided that no conflict exists.

The foregoing embodiments show only several implementations of this application. Descriptions of the embodiments are described in detail and specifically, but not to be construed as a limitation to the patent scope of this application. For a person of ordinary skill in the art, several transformations and improvements can be made without departing from the idea of this application. These transformations and improvements fall within the protection scope of this application. Therefore, the protection scope of this application shall be subject to the appended claims.

What is claimed is:

1. An audio signal processing method, performed by a computer device, the method comprising:

obtaining a set of scenario layout parameters corresponding to a current simulated scenario, the set of scenario layout parameters comprising a linear distance between a receiver and at least one audio source and a reflection coefficient;

sampling, at a preset sampling rate, an audio signal emitted by the at least one audio source to obtain at least one sample;

determining, based on the linear distance between the receiver and the at least one audio source, a simulated traveling distance corresponding to each sample;

determining a number of simulated reflections based on the simulated traveling distance;

determining, based on the reflection coefficient, the simulated traveling distance, and the number of simulated reflections, a simulated reflection loss corresponding to each audio source; and generating a simulated impulse response under the current simulated scenario based on the simulated reflection loss corresponding to each audio source, further including:

updating an initial filter parameter based on the simulated reflection loss corresponding to each audio source to obtain an initial simulated impulse response under the current simulated scenario; and filtering the initial simulated impulse response to obtain a final simulated impulse response as the simulated impulse response under the current simulated scenario.

2. The method according to claim 1, wherein the determining, based on the linear distance between the receiver and the at least one audio source, a simulated traveling distance corresponding to each sample comprises:

obtaining a plurality of preset variable values;

transforming the plurality of preset variable values into a plurality of corresponding distance transform coefficients; and determining, based on each distance transform coefficient and the linear distance, the simulated traveling distance corresponding to each sample at the preset sampling rate.

3. The method according to claim 1, wherein the determining a number of simulated reflections based on the simulated traveling distance comprises:

determining a maximum simulated traveling distance among the simulated traveling distances corresponding to the samples;

determining a maximum number of simulated reflections based on a positive correlation between a traveling distance and a number of reflections of the audio signal as well as the maximum simulated traveling distance; and determining, based on the distance proportional relationship and the maximum number of simulated reflections, the number of simulated reflections corresponding to each simulated traveling distance.

4. The method according to claim 1, wherein after the determining a number of simulated reflections based on the simulated traveling distance, the method further comprises:

updating the number of determined simulated reflections based on random reflection fluctuations, the random reflection fluctuations being obtained based on random sampling in preset uniform distribution.

5. The method according to claim 1, wherein the method further comprises:

obtaining a target audio signal; and performing convolution processing on the target audio signal based on the simulated impulse response, to generate a target audio signal with reverberation.

6. The method according to claim 5, wherein the method further comprises:

adding noise to the target audio signal with reverberation to obtain training data;

determining a reference audio signal corresponding to the training data, the reference audio signal comprising at least one of a denoised audio signal with reverberation and an audio signal without reverberation and noise; and training a target audio processing model based on the training data and the reference audio signal corresponding to the training data to obtain a trained audio processing model.

7. The method according to claim 6, wherein the method further comprises:

obtaining an additional target audio signal, the additional target audio signal comprising a voice audio signal and an accompaniment audio signal; and separating the voice audio signal from the accompaniment audio signal in the additional target audio signal via the trained audio processing model to obtain a pure voice audio signal and a pure accompaniment audio signal.

8. A computer device, comprising a memory and a processor, the memory storing computer-readable instructions, the computer-readable instructions, when executed by the processor, causing the computer device to implement an audio signal processing method including:

obtaining a set of scenario layout parameters corresponding to a current simulated scenario, the set of scenario layout parameters comprising a linear distance between a receiver and at least one audio source and a reflection coefficient;

sampling, at a preset sampling rate, an audio signal emitted by the at least one audio source to obtain at least one sample;

determining, based on the linear distance between the receiver and the at least one audio source, a simulated traveling distance corresponding to each sample;

determining a number of simulated reflections based on the simulated traveling distance;

determining, based on the reflection coefficient, the simulated traveling distance, and the number of simulated reflections, a simulated reflection loss corresponding to each audio source; and generating a simulated impulse response under the current simulated scenario based on the simulated reflection loss corresponding to each audio source, further including:

updating an initial filter parameter based on the simulated reflection loss corresponding to each audio source to obtain an initial simulated impulse response under the current simulated scenario; and filtering the initial simulated impulse response to obtain a final simulated impulse response as the simulated impulse response under the current simulated scenario.

9. The computer device according to claim 8, wherein the determining, based on the linear distance between the receiver and the at least one audio source, a simulated traveling distance corresponding to each sample comprises:

obtaining a plurality of preset variable values;

transforming the plurality of preset variable values into a plurality of corresponding distance transform coefficients; and determining, based on each distance transform coefficient and the linear distance, the simulated traveling distance corresponding to each sample at the preset sampling rate.

10. The computer device according to claim 8, wherein the determining a number of simulated reflections based on the simulated traveling distance comprises:

determining a maximum simulated traveling distance among the simulated traveling distances corresponding to the samples;

determining a maximum number of simulated reflections based on a positive correlation between a traveling distance and a number of reflections of the audio signal as well as the maximum simulated traveling distance; and determining, based on the distance proportional relationship and the maximum number of simulated reflections, the number of simulated reflections corresponding to each simulated traveling distance.

11. The computer device according to claim 8, wherein after the determining a number of simulated reflections based on the simulated traveling distance, the method further comprises:

updating the number of determined simulated reflections based on random reflection fluctuations, the random reflection fluctuations being obtained based on random sampling in preset uniform distribution.

12. The computer device according to claim 8, wherein the method further comprises:

obtaining a target audio signal; and performing convolution processing on the target audio signal based on the simulated impulse response, to generate a target audio signal with reverberation.

13. The computer device according to claim 12, wherein the method further comprises:

adding noise to the target audio signal with reverberation to obtain training data;

determining a reference audio signal corresponding to the training data, the reference audio signal comprising at least one of a denoised audio signal with reverberation and an audio signal without reverberation and noise; and training a target audio processing model based on the training data and the reference audio signal corresponding to the training data to obtain a trained audio processing model.

14. The computer device according to claim 13, wherein the method further comprises:

obtaining an additional target audio signal, the additional target audio signal comprising a voice audio signal and an accompaniment audio signal; and separating the voice audio signal from the accompaniment audio signal in the additional target audio signal via the trained audio processing model to obtain a pure voice audio signal and a pure accompaniment audio signal.

15. A non-transitory computer-readable storage medium, having computer-readable instructions stored thereon, the computer-readable instructions, when executed by a processor of a computer device, causing the computer device to implement an audio signal processing method including:

obtaining a set of scenario layout parameters corresponding to a current simulated scenario, the set of scenario layout parameters comprising a linear distance between a receiver and at least one audio source and a reflection coefficient;

sampling, at a preset sampling rate, an audio signal emitted by the at least one audio source to obtain at least one sample;

determining, based on the linear distance between the receiver and the at least one audio source, a simulated traveling distance corresponding to each sample;

determining a number of simulated reflections based on the simulated traveling distance;

determining, based on the reflection coefficient, the simulated traveling distance, and the number of simulated reflections, a simulated reflection loss corresponding to each audio source; and generating a simulated impulse response under the current simulated scenario based on the simulated reflection loss corresponding to each audio source, further including:

updating an initial filter parameter based on the simulated reflection loss corresponding to each audio source to obtain an initial simulated impulse response under the current simulated scenario; and filtering the initial simulated impulse response to obtain a final simulated impulse response as the simulated impulse response under the current simulated scenario.

16. The non-transitory computer-readable storage medium according to claim 15, wherein after the determining a number of simulated reflections based on the simulated traveling distance, the method further comprises:

updating the number of determined simulated reflections based on random reflection fluctuations, the random reflection fluctuations being obtained based on random sampling in preset uniform distribution.

17. The non-transitory computer-readable storage medium according to claim 15, wherein the method further comprises:

obtaining a target audio signal; and performing convolution processing on the target audio signal based on the simulated impulse response, to generate a target audio signal with reverberation.

18. The non-transitory computer-readable storage medium according to claim 17, wherein the method further comprises:

adding noise to the target audio signal with reverberation to obtain training data;

determining a reference audio signal corresponding to the training data, the reference audio signal comprising at least one of a denoised audio signal with reverberation and an audio signal without reverberation and noise; and training a target audio processing model based on the training data and the reference audio signal corresponding to the training data to obtain a trained audio processing model.

* * * * *